(12) United States Patent
Ikeda et al.

(10) Patent No.: US 7,496,419 B2
(45) Date of Patent: Feb. 24, 2009

(54) MODULATION OUTPUT DEVICE

(75) Inventors: Takeshi Ikeda, Tokyo (JP); Hiroshi Miyagi, Yokohama (JP)

(73) Assignee: Niigata Seimitsu Co., Ltd., Jyoetsu-shi (JP)

( * ) Notice: Subject to any disclaimer, the term of this patent is extended or adjusted under 35 U.S.C. 154(b) by 105 days.

(21) Appl. No.: 11/611,026

(22) Filed: Dec. 14, 2006

(65) Prior Publication Data

US 2007/0083279 A1 Apr. 12, 2007

(30) Foreign Application Priority Data

Jun. 17, 2004 (JP) ............... 2004-179518
Aug. 18, 2004 (JP) ............... 2004-238293

(51) Int. Cl.
*G06F 17/00* (2006.01)
(52) U.S. Cl. .......................................... 700/94; 381/77
(58) Field of Classification Search ........................ None
See application file for complete search history.

(56) References Cited

U.S. PATENT DOCUMENTS 5,831,488 A    11/1998   Nakajima et al.
6,687,314 B1 *  2/2004   Leonard et al. ............. 375/324
2003/0197810 A1 * 10/2003 Jaffe ........................... 348/726
2003/0228855 A1 * 12/2003 Herz et al. ..................... 700/94
2004/0146169 A1 *  7/2004 Chen ............................ 700/94

FOREIGN PATENT DOCUMENTS

| JP | 09-199944 | 7/1997 |
| JP | 09-214252 | 8/1997 |
| JP | 2002-101164 | 4/2002 |
| JP | 2003-110665 | 4/2003 |

\* cited by examiner

*Primary Examiner*—Walter F Briney, III
(74) *Attorney, Agent, or Firm*—Connolly Bove Lodge & Hutz LLP; Myron Keith Wyche

(57) ABSTRACT

A modulation output device including; a DSP 12 for subjecting MP3 music data and the like read out from an MP3 player 50 to stereo modulation, when necessary; D/A converter 14 for converting the digital data outputted from the DSP 12 to an analog signal and outputting the converted analog signal to either an earphone terminal 54 or transmission part 15; and transmission part 15 for transmitting the analog signal outputted from the D/A converter 14 to the outside through a transmission antenna 55 enables the processing concerning reproduction of music data and processing for modulation of the reproduced music data to transmit without wires to be performed by a single DSP 12 and a single D/A converter 14.

15 Claims, 5 Drawing Sheets

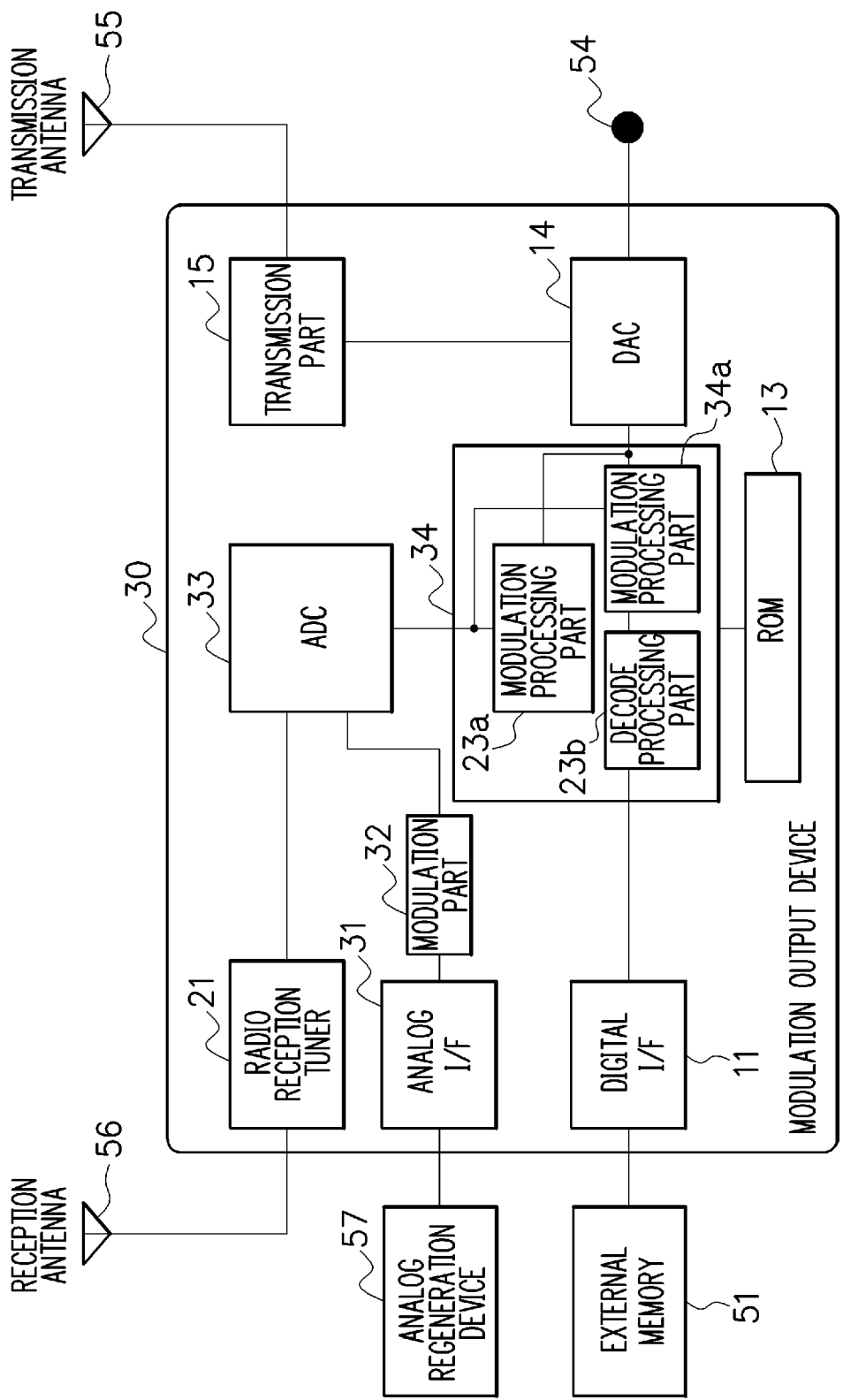

MODULATION OUTPUT DEVICE

FIELD OF THE INVENTION

The present invention relates to a modulation output device and specifically to a modulation output device suitably used to a device which allows MP3 (MPEG-1 Audio Layer 3) music information and the like to be modulated and then transmitted to the outside, for example.

BACKGROUND OF THE INVENTION

In recent years, portable phones which have been widely disseminated go multifunctional and provide various services. A portable phone with a music regeneration function which can store MP3 music information and the like downloaded from a music distribution site and reproduce the music any time you want has been developed lately.

However, in this type of portable phones, a speaker embedded in the portable phone or head phones or earphones connected through a cable to an earphone terminal have to be used when listening the music. Therefore, there are problems that the reproduced music is poor in sound quality and that a cumbersome work is required to listen the music.

Taking these problems into consideration, portable phones or adaptors having a configuration for performing frequency modulation (FM) to the reproduced music information to transmit without wires have been suggested (for example, see Patent Documents 1, 2, and 3). Patent Document 1: Japanese Patent Application Laid-open No. H6-309854; Patent Document 2: Japanese Patent Application Laid-open No. 2003-110665; Patent Document 3: Japanese Patent Application Laid-open No. 2003-204375.

In an adaptor described in the above Patent Document 1, using a CD player secured to the adaptor body together with an FM transmitter provided to the adaptor body, a sound signal outputted from the CD player is converted to an electronic wave in an FM band to be transmitted without wires to a radio with an existing FM. Then, the sound of the CD player can be outputted from an acoustic system inside a car by tuning the radio.

In a portable phone described in the above Patent Document 2, music data stored in a storage part is read out and reproduced as a music signal through decoding and the like. The reproduced music signal is subjected to frequency modulation to be transmitted as an FM signal through an FM antenna. By receiving the FM signal with an FM radio and reproducing the FM signal through demodulation in the FM radio, the music reproduced in the portable phone can be outputted with volume reinforced to the desired level.

A portable phone described in the above Patent Document 3 comprises a key input part for key inputting, a music information storage part for storing music information, music regeneration part for reproducing the music information as a music signal, FM part for performing FM to the music information, and main controlling part for controlling the whole portable phone. Detecting the ON position in the key input part, the main controlling part performs FM to the reproduced music signal in the FM modulation part to transmit without wires.

SUMMARY OF THE INVENTION

However, the above conventional technologies need to have two processing systems i.e. for outputting the reproduced music information to an embedded speaker or earphone terminal and for performing FM to the reproduced music information to be transmitted without wires in order to realize the output of the reproduced MP3 music information and the like through the embedded speaker or earphones of the portable phone or the like as well as the FM to the reproduced music information to be transmitted without wires.

Also, a portable phone with a reception tuner of an FM radio embedded has been developed recently. In order to include a reception function of an FM radio in addition to the above-mentioned regeneration function of MP3 music information and the like and FM transmission function of music information, three processing systems for outputting the reproduced music information to an embedded speaker or earphone terminal, for performing FM to the reproduced sound information to transmit without wires, and for receiving and reproducing FM radio are required.

Moreover, when a function for inputting and reproducing an analog sound other than FM radio is included in the portable phone by embedding an analog input interface, four processing systems in total are required. The more functions in a portable phone, the more complicated and larger-scale in the circuit configuration. Since the smaller and lighter portable phone is strongly demanded through the years, the configuration as simple as possible is required to achieve the demand.

The present invention is to solve such problems and has an object to achieve simple configurations to the extent possible in a function for outputting sound information through an embedded speaker, earphones, and the like of a device such as a portable phone and in a function for modulating a sound information to transmit without wires to the outside of a portable phone.

To solve the above-mentioned problems, a modulation output device of the present invention comprises a processor for performing modulation to digitalized sound information when necessary, D/A converter for converting digital sound data outputted from the processor to an analog signal and selectively outputting the converted analog sound signal either to an embedded speaker or earphone terminal or to a transmission part, transmission part for transmitting the analog modulated signal supplied from the D/A converter to the outside from a transmission antenna.

In another aspect of the present invention, a modulation output device comprises a tuner for receiving an electronic wave of broadcasting and generating an intermediate frequency signal, analog interface part for inputting an analog sound signal, modulation part for converting a frequency at least either of the intermediate frequency signal or of analog sound signal to adjust the frequency of the intermediate frequency signal and the frequency of the analog sound signal to be equal, and A/D converter for converting the intermediate frequency signal and analog sound signal, providing frequencies thereof are adjusted to be equal in the modulation part, to digital sound data.

According to the present invention having the above-mentioned configuration, a single D/A converter is used for two types of processing for converting the digital data outputted from the processor to the analog signal, i.e. processing when sound information is outputted through the speaker embedded in a device, earphone, or the like and processing when sound information is modulated and then transmitted without wires to the outside of the device. Thus, the above-mentioned two types of processing can be performed with a single processor and a single D/A converter. The circuits each having individual processing system for different process are unnecessary. The function of outputting the sound information from the embedded speaker, earphones, or the like and the function of modulating the sound information to transmit without wires to the outside can be achieved with simple configurations to the extent possible.

According to another aspect of the present invention, regarding two types of processing, i.e. processing related to reception and regeneration of broadcasting and processing for modulation and wireless transmission of an inputted analog sound signal, a single A/D converter is shared by both the operation for converting the broadcasting signal to digital data to be supplied to a processor and the operation for converting the analog sound signal to digital data to be supplied to the processor. The function of receiving and reproducing the broadcast and the function of modulating the analog sound information inputted by the analog interface part to transmit without wires to the outside can be achieved with configurations as simple as possible.

BRIEF DESCRIPTION OF THE DRAWINGS

FIG. 5 is a block diagram showing a configuration example of a modulation output device according to third embodiment.

DETAILED DESCRIPTION OF THE PREFERRED EMBODIMENTS

First Embodiment

Figure 1:
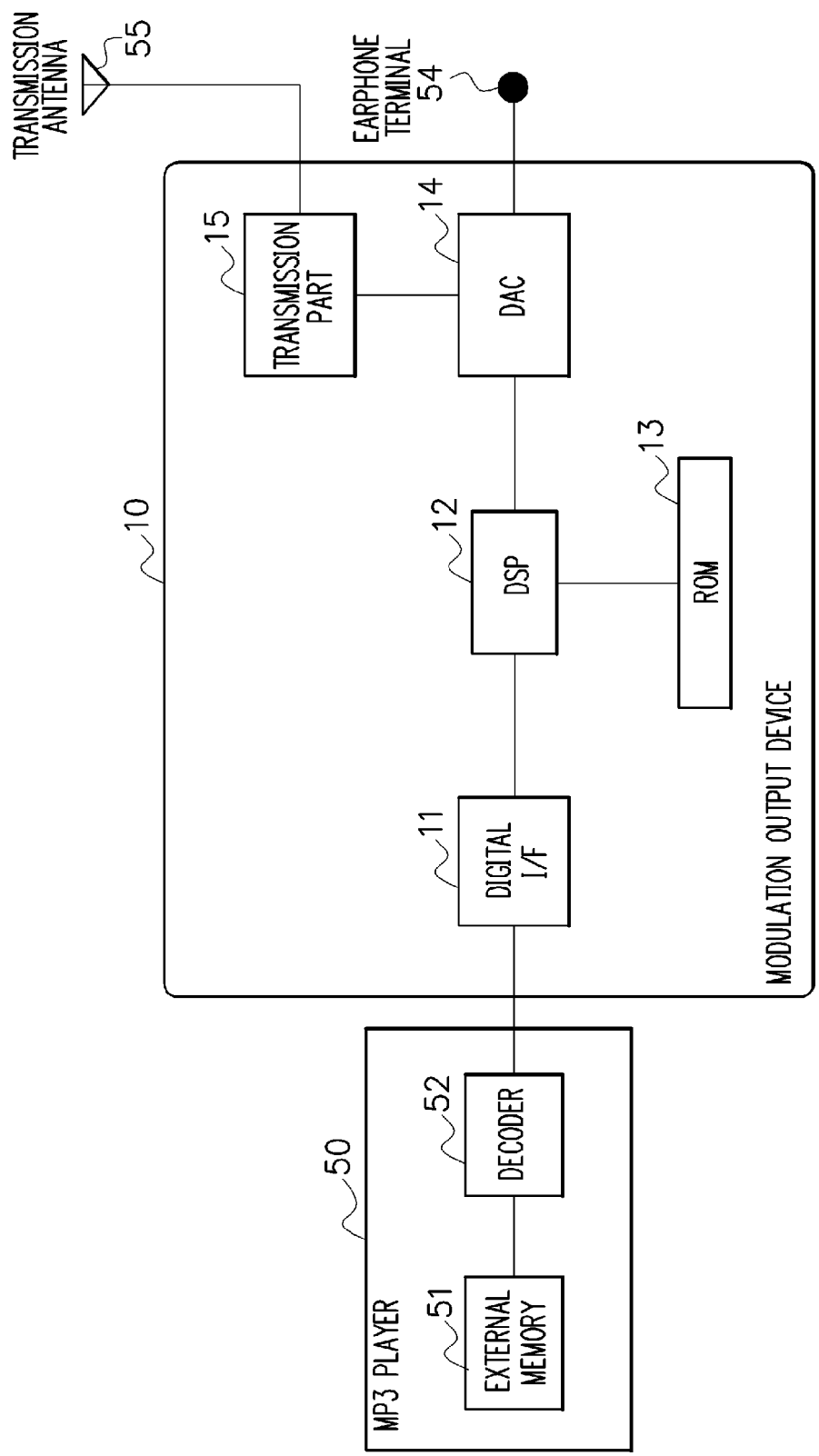
FIG. 1 is a block diagram showing a configuration example of a modulation output device according to first embodiment.

The first embodiment of the present invention will be explained referring to drawings. FIG. 1 is a block diagram showing a configuration example of a modulation output device 10 according to the first embodiment. As shown in FIG. 1, the modulation output device 10 of the present embodiment comprises a digital interface (I/F) 11, digital signal processor (DSP) 12, ROM 13, D/A converter 14, and transmission part 15. These functional blocks 11-15 are all integrated into one chip by CMOS processing. The modulation output device 10 shown in FIG. 1 is, for example, implemented on a portable phone.

The digital I/F 11 is an interface part for exchanging digital data with the external part of the modulation output device 10. For example, the digital I/F 11 whereto an MP3 player 50 is connected inputs MP3 music data and the like stored in the MP3 player 50. For example, the MP3 player is also implemented on the portable phone.

The MP3 player 50 comprises an external memory 51 and decoder 52. The external memory 51 is for storing MP3 music data and the like and comprises a nonvolatile semiconductor memory or hard disc, for example. The decoder 52 is for decoding the music data read out from the external memory 51 and generating digital music data.

The DSP 12 performs processing, when necessary, for modulating the decoded digital music data inputted by the digital I/F 11 to generate digital modulated data (corresponding to first digital modulated data of the present invention). The digital music data inputted by the DSP 12 is stereo sound data of L channel and R channel. The DSP 12 modulates, when needed, the stereo sound data in the frequency range of a baseband.

For example, when the music information reproduced by the MP3 player 50 is outputted from the embedded speaker, earphones or the like (not shown) of the portable phone, no modulation is performed by the DSP 12. On the other hand, when the music information reproduced by the MP3 player 50 is modulated to be transmitted without wires to the outside of the portable phone, modulation is performed by the DSP 12.

The modulation method performed by the DSP 12 is arbitrary. The modulation methods such as amplitude modulation (AM), frequency modulation (FM), phase modulation (PM), frequency-shift keying (FSK), phase-shift keying (PSK), amplitude phase-shift keying (APSK), and modulation methods of digital broadcasting (IQ modulations such as quadrature phase shift keying (QPSK), bi-phase shift keying (BPSK), and quadrature amplitude modulation (QAM)) are applicable. The ROM 13 stores programs for controlling the DSP 12 action. A variety of operation keys (not shown) are provided for the portable phone whereon the modulation output device 10 is implemented. By operating these operation keys, users can designate either an action for internal regeneration of MP3 music information and the like (output to the embedded speaker and the like) or an action for modulation and transmission of the reproduced music information. The DSP 12 performs digital signal processing according to the controlling program corresponding to the designated action among a variety of controlling programs stored in the ROM 13.

The D/A converter 14 converts the digital music data and digital modulated data outputted from the DSP 12 to an analog signal. When D/A conversion is performed to the digital music data, the converted analog music signal (corresponding to first analog sound signal of the present invention) is outputted to an earphone terminal 54 or speaker (not shown) embedded in a portable phone. When D/A conversion is performed to the digital modulated data, the converted analog modulated signal (corresponding to first analog modulated signal of the present invention) is outputted to the transmission part 15.

The switchover between the output directions is performed by, for example, the DSP 12 according to the controlling program stored in the ROM 13. A switch for selecting the output direction may be provided to the output stage of the D/A converter 14, for example. When it is designated that the music information reproduced by the MP3 player 50 is outputted from the embedded speaker, earphones, or the like of the portable phone, the switch is changed to the earphone terminal 54 or speaker (not shown) embedded in the portable phone by the control of the DSP 12. On the other hand, when it is designated that the music information reproduced by the MP3 player 50 is modulated to be transmitted without wires to the outside of the portable phone, the switch is changed to the transmission part 15 by the control of the DSP 12.

The transmission part 15 transmits the analog modulated signal outputted from the D/A converter 14 to the outside through the transmission antenna 55. Before the transmission, the transmission part 15 modulates the analog modulated signal outputted from the D/A converter 14 in the frequency range of the carrier to increase its frequency up to the wireless-transmittable frequency band. The modulation method in this instance is arbitrary. For example, AM, FM, PM, and the like are applicable. The analog modulated signal transmitted from the transmission part 15 to the outside is received by a radio receiver (not shown), a device other than the portable phone. By demodulating the analog modulated signal to be reproduced in the radio receiver, the MP3 music information and the like reproduced from the external memory 51 of the portable phone can be outputted through a high-performance speaker of the radio receiver. Although the radio receiver is used as an example, another electronic device provided with a function for demodulating the received analog modulated signal to be outputted through its speaker is also appropriate.

As shown in FIG. 1, in regard to the two types of processing i.e. the processing for outputting the MP3 music information and the like from the embedded speaker, earphones, or the like of the portable phone and the processing for modulating the reproduced music information to be transmitted without wires, a single D/A converter 14, which converts the digital data outputted from the DSP 12 to the analog signal, is used in the modulation output device 10 of the present invention by switching the output direction in each processing rather than two D/A converters different in each processing. This eliminates the need for a plurality of D/A converters different in each of two processing. Thus, the function for outputting the MP3 music information and the like reproduced from the external memory 51 through the embedded speaker, earphones, or the like of the portable phone and the function for modulating the reproduced music information to be transmitted to the outside can be actualized with simple configurations to the extent possible. These configurations lead to the minimization and weight saving of portable phones.

Figure 2:
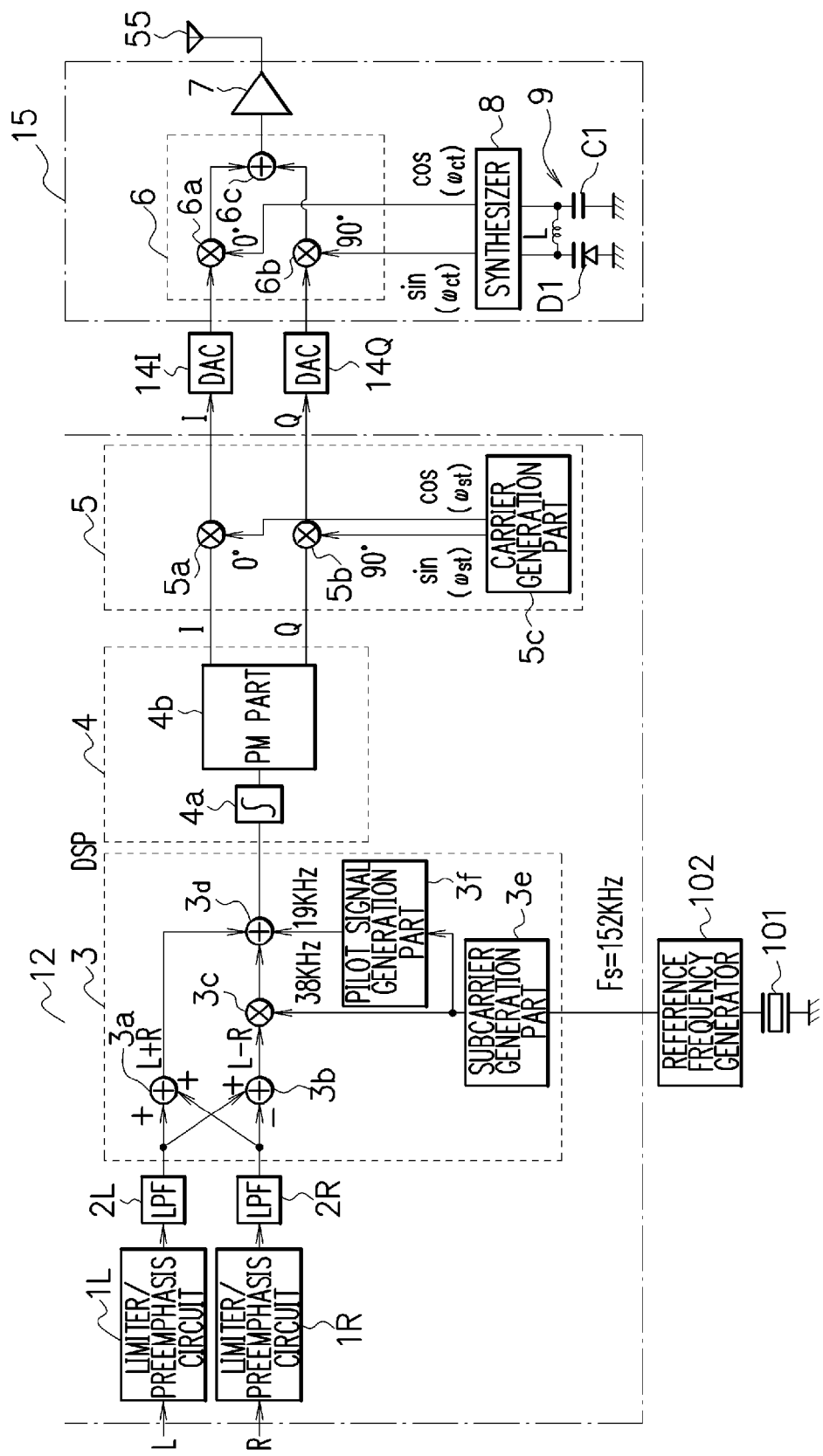
FIG. 2 is a diagram showing a configuration example of a DSP according to first embodiment and a modulation processing part in DSP according to second and third embodiments.

FIG. 2 is a diagram showing a configuration example in detail of the above-mentioned DSP 12 and transmission part 15. This configuration example is in the case that IQ modulation (quadrature modulation) is used as a modulation method.

Limiter/preemphasis circuits denoted with 1L and 1R in FIG. 2 perform the processing to limit the amplification and the processing to emphasize the modulation degree of the high frequency respectively to the L channel signal and R channel signal inputted by the digital I/F 11 as digital signals. The low pass filters (LPF) denoted with 2L and 2R limit the band respectively to the amplitude-limited and high frequency-emphasized L channel signal and R channel signal.

A stereo signal generation part denoted with 3 generates a stereo composite signal from the L channel signal and R channel signal passed through the LPF 2L and 2R. The stereo signal generation part 3 comprises an adder 3a, subtracter 3b, balanced modulator 3c, adder 3d, subcarrier generation part 3e, and pilot signal generation part 3f.

The adder 3a and subtracter 3b constituting a matrix circuit convert the L channel signal and R channel signal respectively outputted from the LPF 2L and 2R to a summed signal (main signal) obtained from a formula: L+R and a differential signal (sub signal) obtained from a formula: L−R. The summed signal L+R and differential signal L−R generated here are outputted to the adder 3d and balanced modulator 3c, respectively.

The balanced modulator 3c performs AM to a subcarrier signal with a frequency of 38 KHz inputted from the subcarrier generation part 3e by a carrier suppression system using the differential signal L−R inputted form the subtracter 3b and outputs the resulting signal as a sub signal to the adder 3d.

A frequency of the subcarrier signal outputted from the above-mentioned subcarrier generation part 3e is multiplied by one half (½) in the pilot signal generation part 3f to be outputted to the adder 3d as a pilot signal with a frequency of 19 KHz. The adder 3d synthesizes the summed signal L+R outputted from the adder 3a, balanced-modulated differential signal L−R outputted from the balanced modulator 3c, and the pilot signal outputted from the pilot signal generation part 3f and then outputs the synthesized result as a stereo composite signal.

A first quadrature modulation part denoted with 4 comprises an integration circuit 4a and PM part 4b for generating an FM signal. The integration circuit 4a integrates the stereo composite signal outputted from the stereo signal generation part 3.

The PM part 4b performs PM in the baseband frequency range to the stereo composite signal generated by the stereo signal generation part 3 and passed through the integration circuit 4a. Specifically, the PM part 4b has the sin table information of (sin $\omega_m t$) and the cos table information of (cos $\omega_m t$) and divides by using these table information the inputted stereo composite signal into an in-phase signal (I signal) and quadrature signal (Q signal) which phase is perpendicular to that of the I signal. Then, the phase modulation is performed to the divided I signal and Q signal in the baseband frequency range. The baseband frequency used here is, for example, in the range from 0 to 75 KHz.

That the stereo composite signal inputted from the stereo signal generation part 3 is subjected to integration and then to PM with its signal in this way is that the stereo composite signal is subjected to FM. The absent of the integration circuit 4a permits PM to the stereo composite signal. Also, the absent of the integration circuit 4a and the presence of the AM part instead of the PM part 4b permit AM to the stereo composite signal.

A frequency offset part denoted with 5 applies an offset to the frequencies of I signal and Q signal inputted from the first quadrature modulation part 4. The offset frequency applied here is, for example, 308 KHz or 1.92 MHz.

The frequency offset part 5 comprises a first mixer 5a, second mixer 5b, and carrier generation part 5c. The first mixer 5a shifts the frequency of I signal with the in-phase (cos $\omega_s t$) carrier wave inputted from the carrier generation part 5c. The second mixer 5b shifts the frequency of Q signal with the quadrature (sin $\omega_s t$) carrier wave inputted from the carrier generation part 5c. The frequency of the carrier used here is 308 KHz or 1.92 MHz.

The carrier generation part 5c generates in-phase and quadrature carrier waves with a frequency of 308 KHz, for example, which amplitudes are almost the same and phases have a deviation of 90°, and supplies the in-phase carrier wave and quadrature carrier wave to the first mixer 5a and second mixer 5b, respectively. The carrier generation part 5c also has the sin table information and cos table information and generates the cos $\omega_x t$ carrier wave and sin $\omega_x t$ carrier wave using these table information.

Although the I and Q signals which amplitudes are the same and phases have a deviation of 90° each other need to be produced when performing IQ modulation, it is difficult to produce such I and Q signals by analog signal processing. Because of unevenness of the elements and variation of the delay in the analog circuit, it is difficult to produce the signals which amplitudes are the same and phases have a deviation of 90° in an accurate fashion. Therefore, if the modulation processing is performed by the DSP 12 as the digital signal processing such as in the present embodiment, IQ modulation is easily performed.

In practice, a crystal oscillation circuit and reference frequency generator (not shown in FIG. 1) such as those denoted with 101 and 102 in FIG. 2 are present in the external DSP 12. Of these, the reference frequency generator 102 is integrated into one chip together with a variety of functional blocks 11-15 by CMOS processing.

The crystal oscillation circuit 101 generates a signal with a prescribed frequency. The reference frequency generator 102 divides the frequency of a clock signal outputted from the crystal oscillation circuit 101 by a fixed divide ratio and generates a reference signal with sampling frequency Fs. The sampling frequency Fs is, for example, 152 KHz. The subcarrier generation part 3e generates 38 KHz subcarrier signal obtained by equally dividing the sampling frequency Fs of the reference signal into four.

D/A converters denoted with 14I and 14Q respectively convert the I signal and Q signal each inputted from the frequency offset part 5 as a digital signal into an analog signal.

A second quadrature modulation part denoted with 6 performs quadrature modulation using the I signal and Q signal each converted to the analog signal by the D/A converters 14I and 14Q. Specifically, the first mixer 6a in the second quadrature modulation part 6 modulates the I signal supplied from the D/A converter 14I with the in-phase (cos $\omega_c t$) carrier wave. The second mixer 6b modulates the Q signal supplied from the D/A converter 14Q with the quadrature (sin $\omega_c t$) carrier wave. The frequency of the carrier wave used here is, for example, in the FM frequency band from 76 to 108 MHz. The adder 6c synthesizes the I signal and Q signal respectively quadrature modulated by the mixer 6a and mixer 6b to output a stereo FM signal as a final signal.

The second quadrature modulation part 6 different from the first quadrature modulation part 4 comprised in the DSP 12 realizes IQ modulation as an analog circuit. In the first quadrature modulation part 4, amplitudes and phases of the carrier waves for I signal and Q signal need to be adjusted with high accuracy in order to perform modulation in the range of the low-frequency and wide baseband. Therefore, the DSP 12 as for digital signal processing is appropriate. On the other hand, in the second quadrature modulation part 6, less accuracy is required to the amplitudes and phases of the carrier waves than the case that IQ modulation is performed in the baseband range because the modulation frequency is in a high-frequency and narrow band of the FM frequency band. Therefore, it is possible to comprise the second quadrature modulation part 6 comprised as an analog circuit.

In general, the frequency conversion when performing frequency modulation causes image noise and carrier leak. However, in the present embodiment, the modulation is performed through three stages by providing the first quadrature modulation part 4 for performing IQ modulation in the baseband frequency range of 0 to 75 KHz, frequency offset part 5 for adding an offset frequency of 308 KHz or 1.92 MHz, second quadrature modulation part 6 for performing IQ modulation in the FM frequency range. Then, the I signal and Q signal generated by the first quadrature modulation part 4 are processed in the frequency offset part 5 to make a deviation of 90° between these phases. This results in the attenuated side spurious and the suppressed carrier leak and image noise occurred when an offset of 308 KHz or 1.92 MHz is added to the frequency of 0-75 KHz. Furthermore, by shifting the phases of the I signal and Q signal generated in the frequency offset part 5 to make a deviation of 90° by the second quadrature modulation part 6, side spurious can be attenuated and carrier leak and image noise occurred when a frequency of 308 KHz or 1.92 MHz is converted to an FM frequency can be suppressed.

An RF amp denoted with 7 amplifies a stereo modulation signal outputted from the second quadrature modulation part 6 to be transmitted via a transmission antenna 55. A synthesizer denoted with 8 generates carrier waves to be supplied to two mixers 6a and 6b in the second quadrature modulation part 6. Specifically, the synthesizer 8 generates in-phase and quadrature carrier waves, providing that these amplitudes are almost the same and phases have a deviation of 90° each other, and supplies the in-phase carrier wave and the quadrature carrier wave to the first mixer 6a and second mixer 6b, respectively. A load capacity changing part denoted with 9 comprises a coil L, variable capacity diode D1, and capacitor C1. The frequency of the carrier wave generated from the synthesizer 8 is variably controlled by using the variable capacity diode D1.

Although a crystal oscillation circuit and reference frequency generator included in the synthesizer 8 are used for generating carrier waves in this example, the reference signal outputted from the reference frequency generator 102 may be used for generating carrier waves.

In the first embodiment, the configuration elements of the modulation output device 10 including the ROM 13 are integrated into one chip as an example. The ROM 13 may be provided outside the chip.

Figure 3:
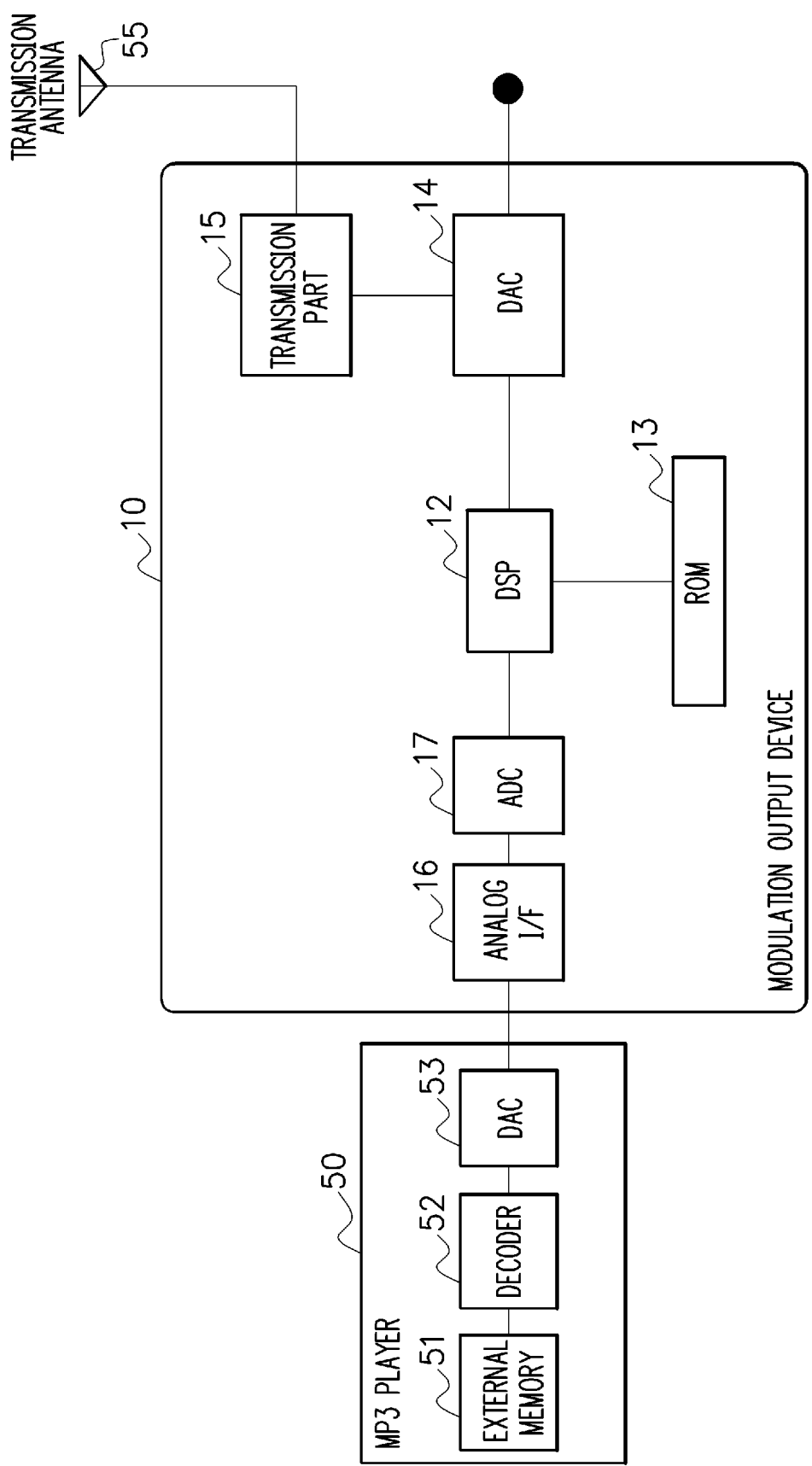
FIG. 3 is a block diagram showing a modified example of a modulation output device according to first embodiment.

Although, in the above-mentioned first embodiment, the modulation output device 10 comprising the digital I/F 11 inputs the digital music data from the MP3 player 50 via the digital I/F 11, this example is not construed as limiting the present embodiment. For example, as shown in FIG. 3, a modulation output device 10 may comprise an analog I/F 16 and A/D converter 17 instead of the digital I/F 11 while further providing a MP3 player 50 with a D/A converter 53. There are a crystal oscillation circuit and reference frequency generator (not shown in FIG. 3) such as those denoted with 101 and 102 in FIG. 2 outside the DSP 12 in a real-world situation.

In the case of the configuration such as in FIG. 3, the D/A converter 53 converts a digital music data generated by a decoder 52 to an analog signal. The analog I/F 16 whereto the MP3 player 50 is connected inputs the analog music signal from the MP3 player 50. The A/D converter 17 converters the analog music signal inputted by the analog I/F 16 to digital music data. The DSP 12 performs processing, when necessary, for generating digital modulated data by stereo-modulating the digital music data outputted from the A/D converter 17.

Second Embodiment

Figure 4:
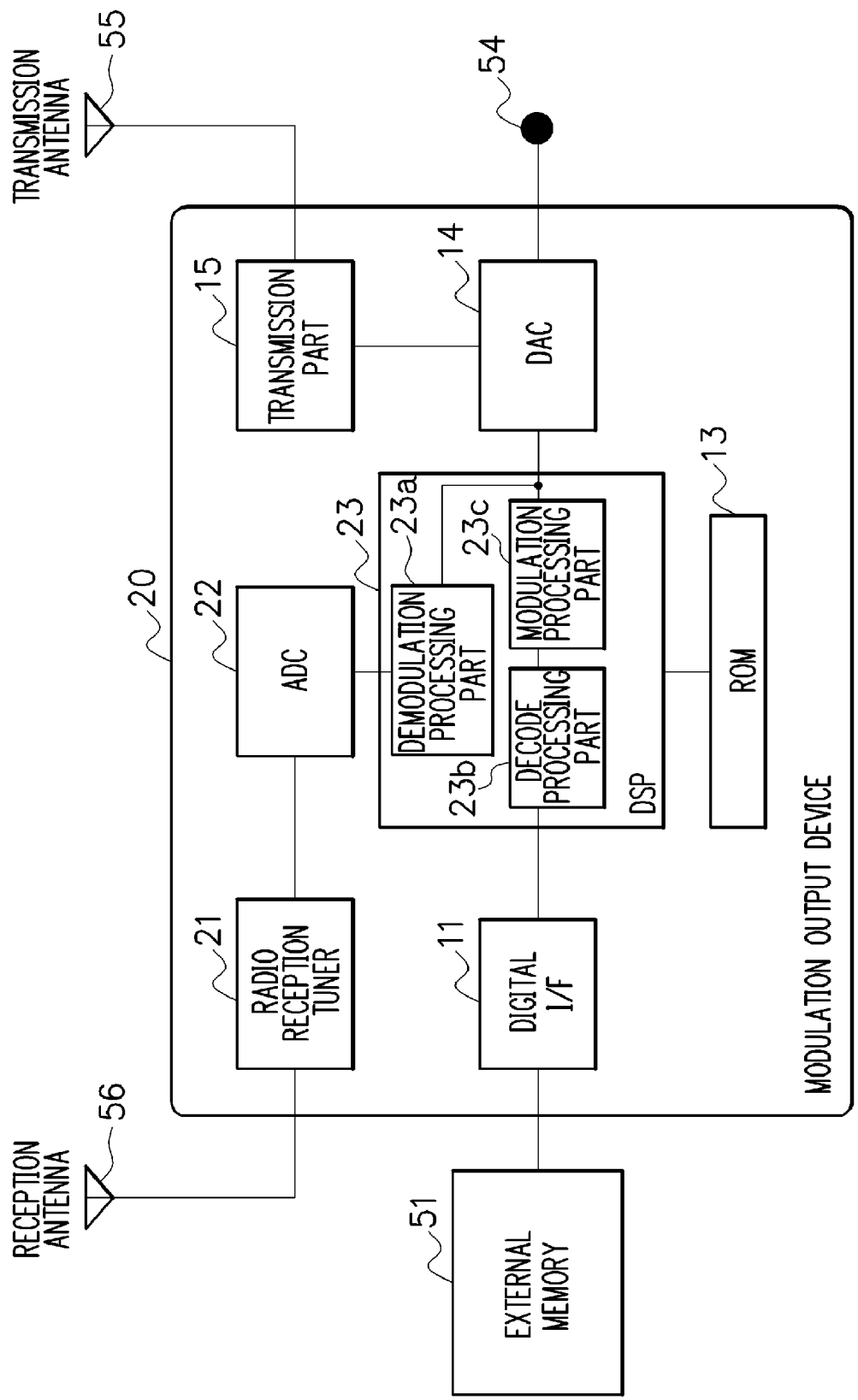
FIG. 4 is a block diagram showing a configuration example of a modulation output device according to second embodiment.

The second embodiment of the present invention will be now described referring to drawings. FIG. 4 is a block diagram showing a configuration example of a modulation output device 20 according to the second embodiment. Since the several structural elements in FIG. 4 have the identical functions to those in FIG. 1, redundant description of these structural elements will be omitted by applying the same reference numbers as in FIG. 1.

As shown in FIG. 4, the modulation output device 20 of the present embodiment comprises a digital I/F 11, ROM 13, D/A converter 14, transmission part 15, radio reception tuner 21, A/D converter 22, and DSP 23. All of these functional blocks are integrated into one chip by CMOS processing. The modulation output device 20 shown in FIG. 4 is implemented on a portable phone together with the external memory 51, for example.

The radio reception tuner 21 receives an electronic wave of radio broadcasting to generate an intermediate frequency signal. Specifically, the radio reception tuner 21 comprises a high frequency amplitude circuit, mixer circuit, and local oscillation circuit. The high frequency amplitude circuit amplitudes a high frequency signal of radio broadcasting received by the reception antenna 56 to the level required for the following frequency conversion. The mixer circuit generates an intermediate frequency signal to be outputted by mixing the high frequency signal amplified in the high frequency amplitude circuit with the signal of the local oscillation frequency controlled by the local oscillation circuit according to the desired reception frequency. The radio reception tuner 21 may be a reception tuner for FM, reception tuner for AM, or reception tuner for both AM and FM. A reception tuner of satellite broadcasting, digital broadcasting, or the like may be used instead of the radio reception tuner 21.

The A/D converter 22 converts the intermediate frequency signal outputted from the radio reception tuner 21 to digital radio data (corresponding to digital broadcasting data of the present invention).

The digital I/F 11 whereto the external memory 51 is connected inputs the MP3 music data and the like stored in the external memory 51.

The DSP 23 comprises a demodulation processing part 23*a*, decode processing part 23*b*, and modulation processing part 23*c* as its functional configuration. The demodulation processing part 23*a* generates digital demodulated data by performing detection, stereo demodulation, de-emphasis, and the like to the digital radio data outputted from the A/D converter 22. The decode processing part 23*b* generates digital music data (corresponding to first digital sound data of the present invention) by decoding the music data inputted by the digital I/F 11. The modulation processing part 23*c* generates digital modulated data (corresponding to first digital modulated data of the present invention) by stereo-modulating the digital music data generated by the above-mentioned decode processing. The digital music data inputted by the modulation processing part 23*c* is stereo sound data of L channel and R channel. The modulation processing part 23*c* has the same configuration as in the DSP 12 in FIG. 2. There are a crystal oscillation circuit and reference frequency generator (not shown in FIG. 4) such as those denoted with 101 and 102 in FIG. 2 outside the DSP 23 in the real-world situation.

The processing in the demodulation processing part 23*a*, decode processing part 23*b*, and modulation processing part 23*c* is selectively performed according to various controlling programs stored in the ROM 13. For example, when the sound information of the radio broadcasting received in the radio reception tuner 21 is outputted through an embedded speaker, earphones, or the like (not shown) of the portable phone, no operation is performed in the decode processing part 23*b* and modulation processing part 23*c* excepting the demodulation processing part 23*a*.

When the MP3 music information and the like reproduced from the external memory 51 is outputted through the embedded speaker, earphones, or the like (not shown) of the portable phone, no operation is performed in the demodulation processing part 23*a* and modulation processing part 23*c* excepting the decode processing part 23*b*. On the other hand, when the MP3 music information and the like is modulated to be transmitted without wires to the outside of the portable phone, no operation is performed in the demodulation processing part 23*a* excepting the decode processing part 23*b* and modulation processing part 23*c*.

The modulation method performed by the modulation processing part 23*c* is arbitrary. For example, AM, FM PM, FSK, PSK, APSK, modulation methods of digital broadcasting (IQ modulation such as QPSK, BPSK, QAM) and the like are applicable. The same modulation processing is performed by the modulation processing part 23*c* as in the DSP 12 in FIG. 1.

A variety of operation keys are provided for the portable phone whereon the modulation output device 20 is implemented. By operating these operation keys, users can designate one of the action for reception and regeneration of radio, action for internal regeneration (output to the embedded speaker or the like) of MP3 music information and the like, and action for modulation and transmission of reproduced music information. The DSP 23 performs digital signal processing according to the controlling program corresponding to the designated action among various controlling programs stored in the ROM 13.

The D/A converter 14 converts the digital demodulated data, digital music data, and digital modulated data outputted from the DSP 23 to analog signals. When D/A conversion is performed to the digital demodulated data, the converted analog demodulated signal is outputted to the earphone terminal 54 of the portable phone or the speaker embedded in the portable phone (not shown). When D/A conversion is performed to the digital music data, the converted analog music signal (corresponding to first analog sound signal of the present invention) is outputted to the earphone terminal 54 or the speaker embedded in the portable phone (not shown). When D/A conversion is performed to the digital modulated data, the converted analog modulated signal (corresponding to first analog modulated signal of the present invention) is outputted to the transmission part 15.

The switchover among these output directions is performed, for example, by the DSP 23 according to the controlling program stored in the ROM 13. For example, a switch for selecting the output direction is provided to the output phase of the D/A converter 14. Then, when it is designated that the music information received in the radio reception tuner 21 or the MP3 music information and the like read out by the external memory 51 is outputted to the embedded speaker, earphones or the like of the portable phone, the switch is changed to the earphone terminal 54 or speaker embedded in the portable phone (not shown) by the control of the DSP 23. On the other hand, when it is designated that the MP3 music information and the like read out from the external memory 51 is modulated to be transmitted without wires to the outside of the portable phone, the switch is changed to the transmission part 15 by the control of the DSP 23.

As shown in FIG. 4, in the modulation output device 20 of the second embodiment, every processing related to demodulation of the intermediate frequency signal of the radio broadcasting, processing related to regeneration of the MP3 music information and the like, processing for modulating the reproduced music information to be transmitted without wires is performed by the DSP 23 as digital signal processing. In this way, three types of processing are preformed by a single DSP 23, eliminating the need for providing the circuits each different in processing system.

Also, regarding the D/A converter which converts the digital data outputted from the DSP 23 to the analog signal, a single D/A converter 14 rather than three D/A converters each having individual processing system is used by changing the output direction in each processing. This eliminates the need for providing a plurality of D/A converters. Accordingly, the function for outputting through the embedded speaker, earphones, or the like of the portable phone the MP3 music information and the like reproduced from the external memory 51, the function for modulating the reproduced music information to be transmitted to the outside, and the function for receiving the radio broadcasting to be reproduced are accomplished with as simple configurations as possible. These configurations can lead to the smaller and lighter portable phones.

Although, in the above-mentioned second embodiment, the modulation output device 20 including the radio reception tuner 21 and A/D converter 22 as configuration elements is integrated into one chip as an example, this is not construed as limiting the present invention. The modulation output device of the present invention including the digital I/F 11, DSP 23, ROM 13, D/A converter 14, and transmission part 15 but the radio reception tuner 21 and A/D converter 22 may be integrated into one chip.

Although the example wherein the modulation output device 20 including the ROM 13 as a configuration element is integrated into one chip is explained in the above-mentioned second embodiment, the ROM 13 may be provided outside the chip.

Besides, although the example wherein the sound information of the radio broadcasting received in the radio reception tuner 21 is certainly outputted through the embedded speaker, earphones, or the like of the portable phone is explained in the above-mentioned embodiment, the sound information of radio broadcasting may be modulated to be transmitted to the outside.

Third Embodiment

The third embodiment of the present invention will be explained referring to the drawings. FIG. 5 is a block diagram showing a configuration example of a modulation output device 30 according to the third embodiment. Since the several structural elements in FIG. 5 have the identical functions to those in FIG. 4, redundant description of these structural elements will be omitted by applying the same reference numbers as in FIG. 4

As shown in FIG. 5, the modulation output device 30 according to the third embodiment comprises a digital I/F 11, ROM 13, D/A converter 14, transmission part 15, radio reception tuner 21, analog I/F 31, modulation part 32, A/D converter 33, and DSP 34. These functional blocks are all integrated into one chip by CMOS processing. The modulation output device 30 shown in FIG. 5 is implemented, for example, on a portable phone together with an external memory 51 and analog regeneration device 57.

The analog I/F 31 is an interface part for exchanging an analog signal with the analog regeneration device 57 externally connected to the modulation output device 30. Thus, the analog I/F 31 whereto the analog regeneration device 57 is connected inputs an analog sound signal reproduced by the analog regeneration device 57.

The modulation part 32 modulates the frequency of the analog sound signal inputted by the analog I/F 31 to obtain a converted signal which frequency band is almost the same with that for an intermediate frequency signal inputted from the radio reception tuner 21.

The A/D converter 33 converts the intermediate frequency signal outputted from the radio reception tuner 21 to digital radio data. The A/D converter 33 also converts the analog sound signal outputted from the modulation part 32 to digital sound data. In the present embodiment, the A/D converter 33 is operated with a comparatively high frequency conforming to a frequency of the intermediate frequency signal outputted from the radio reception tuner 21. In this instance, it is preferable that the analog sound signal in a comparatively low frequency band inputted by the analog I/F 31 be frequency-modulated in the modulation part 32 to obtain a converted signal which frequency band is almost the same with that of an operation frequency in the A/D converter 33.

The A/D converter 33 may be operated with a comparatively low frequency conforming to a comparatively low frequency of the analog sound signal inputted by the analog I/F 31. In this instance, it is preferable that the modulation part 32 be provided after the radio reception tuner 21 and the intermediate frequency signal outputted from the radio reception tuner 21 be frequency-modulated in the modulation part 32 to obtain a converted signal which frequency band is almost the same with that of a low operation frequency in the A/D converter 33.

The DSP 34 comprises a demodulation processing part 23a, decode processing part 23b, and modulation processing part 34a as its functional elements. The demodulation processing part 23a generates digital demodulated data by performing detection, stereo demodulation, de-emphasis, and the like to the digital radio data outputted from the A/D converter 33. The decode processing part 23b generates digital music data (corresponding to first digital sound data of the present invention) by decoding the music data inputted by the digital I/F 11.

The modulation processing part 34a generates digital modulated data (corresponding to first digital modulated data of the present invention) by stereo-modulating the digital music data generated by the above-mentioned decode processing. The modulation processing part 34a also generates digital modulated data (corresponding to second digital modulated data of the present invention) by stereo-modulating the digital sound data (corresponding to second digital sound data of the present invention) outputted from A/D converter 33. The digital data inputted by the modulation processing part 34a is stereo sound data of L channel and R channel. The modulation processing part 34a has the same configuration with that in the DSP 12 in FIG. 2. A crystal oscillation circuit and reference frequency generator (not shown in FIG. 5) such as those denoted with 101 and 102 in FIG. 2 are present outside the DSP 34 in the real-world situation.

Processing in the demodulation processing part 23a, decode processing part 23b, and modulation processing part 34a is selectively performed according to various controlling programs stored in the ROM 13. For example, when the sound information of radio broadcasting received by the radio reception tuner 21 is outputted through the embedded speaker, earphones, or the like (not shown) of the portable phone, no operation is performed in the decode processing part 23b and modulation processing part 34a excepting the demodulation processing part 23a.

When MP3 music information or the like reproduced from the external memory 51 is outputted through the embedded speaker, earphones, or the like (not shown) of the portable phone, no operation is performed in the demodulation processing part 23a and modulation processing part 34a excepting the decode processing part 23b. On the other hand, when the MP3 music information or the like is modulated to be transmitted without wire to the outside of the portable phone, no operation is performed in the demodulation processing part 23a excepting the decode processing part 23b and modulation processing part 34a.

Also, when the sound information inputted by the analog I/F 31 is outputted through the embedded speaker, earphones, or the like (not shown) of the portable phone, no operation is performed in the demodulation processing part 23a, decode processing part 23b, and modulation processing part 34a. On the other hand, when the sound information inputted by the analog I/F 31 is modulated to be transmitted without wires to the outside of the portable phone, no operation is performed in the demodulation processing part 23a and decode processing part 23b excepting the modulation processing part 34a.

The modulation method by the modulation processing part 34a is arbitrary. For example, AM, FM, PM, FSK, PSK, APSK, and modulation methods of digital broadcasting (IQ modulation such as QPSK, BPSK, and QAM) are applicable.

The same modulation processing is performed by the modulation processing part 34a as in the DSP 12 in FIG. 1.

A variety of operation keys are provided for the portable phone whereon the modulation output device 30 is implemented. By operating these operation keys, users can designate one of the action for reception and regeneration of radio, action for internal regeneration (output to the embedded speaker or the like) of MP3 music information or the like, action for internal regeneration of the analog sound signal, and action for modulation and transmission of reproduced music information or reproduced sound information. The DSP 34 performs digital signal processing according to the controlling program corresponding to the designated action among various controlling programs stored in the ROM 13.

The D/A converter 14 converts to an analog signal the digital demodulated data (obtained by digitalizing and processing the radio signal), digital music data (obtained by reproducing the MP3 music data and the like), digital sound data (obtained by digitalizing and processing the reproduced analog sound signal), and digital modulated data (obtained by stereo-modulating the digital music data or digital sound data) outputted from the DSP 34.

When D/A conversion is performed to the digital demodulated data, the converted analog demodulated signal is outputted to the earphone terminal 54 of the portable phone or the speaker embedded in the portable phone (not shown) by the D/A converter 14. When D/A conversion is performed to the digital music data, the converted analog sound signal is outputted to the earphone terminal 54 or speaker embedded in the portable phone (not shown). When D/A conversion is performed to the digital sound data, the converted analog music signal is outputted to the earphone terminal 54 or speaker embedded in the portable phone (not shown). When D/A conversion is performed to the digital modulated data, the converted analog modulated signal is outputted to the transmission part 15.

The switchover among such output directions is performed, for example, by the DSP 34 according to the controlling programs stored in the ROM 13. For example, a switch for selecting the output direction is provided to the output phase of the D/A converter 14. Then, when it is designated that the music information received in the radio reception tuner 21, the MP3 music information or the like read out by the external memory 51, or the music information inputted by the analog I/F 31 is outputted through the embedded speaker, earphones or the like of the portable phone, the switch is changed to either the earphone terminal 54 or the speaker embedded in the portable phone (not shown) through the DSP 34 operation. On the other hand, when it is designated that the MP3 music information read out from the external memory 51 or the sound information inputted by the analog I/F 31 is modulated to be transmitted without wires to the outside of the portable phone, the switch is changed to the transmission part 15 through the DSP 34 operation.

As shown in FIG. 5, in the modulation output device 30 of the third embodiment, every processing related to demodulation of the intermediate frequency signal of the radio broadcasting, processing related to regeneration of the MP3 music information or the like, processing related to regeneration of the analog sound signal, and processing of modulation of the reproduced music information to be transmitted without wires is performed by the DSP 34 as digital signal processing. In this way, four types of processing are preformed by a single DSP 23, eliminating the need for providing the circuits each different in processing system.

Also, regarding the D/A converter which converts the digital data outputted from the DSP 34 to the analog signal, a single D/A converter 14 rather than four D/A converters each having individual processing system is used by changing the output direction for each processing. This eliminates the need for providing a plurality of D/A converters.

Moreover, regarding the A/D converter used for supplying digital data to the DSP 34, only a single A/D converter 33 is used to perform conversion instead of providing A/D converters different in each purpose which is for converting the intermediate frequency signal of radio broadcasting to digital data or for converting analog sound signal reproduced by the analog regeneration device 57 to digital data. This eliminates the need for a plurality of A/D converters.

Accordingly, the function for outputting the MP3 music information or the like reproduced from the external memory 51 through the embedded speaker, earphones, or the like of the portable phone, function for outputting the sound information reproduced by the external analog regeneration device 57 through the embedded speaker, earphones, or the like of the portable phone, function for modulating the reproduced music information and sound information to be transmitted to the outside, and function for receiving the radio broadcasting to be reproduced can be accomplished with as simple configurations as possible. These configurations can contribute to the smaller and lighter portable phones.

Although the example wherein the module output device 30 including the digital I/F 11 as a configuration element is integrated into one chip is explained in the above-mentioned third embodiment, this is not construed as limiting the present invention. The module output device of the present invention including the ROM 13, D/A converter 14, transmission part 15, radio reception tuner 21, analog I/F 31, modulation part 32, A/D converter 33, and DSP 34 except for the digital I/F 11 may be integrated into one chip.

Besides, although the example wherein the module output device 30 including the radio reception tuner 21 as a configuration element is integrated into one chip is explained in the above-mentioned third embodiment, this is not construed as limiting the present invention. The module output device of the present invention including the digital I/F 11, ROM 13, D/A converter 14, transmission part 15, analog I/F 31, modulation part 32, A/D converter 33, and DSP 34 except for the radio reception tuner 21 may be integrated into one chip.

Although the example wherein the modulation output device 30 including the ROM 13 as a configuration element is integrated into one chip is explained in the above-mentioned third embodiment, the ROM 13 may be provided outside the chip.

Besides, although the example wherein the sound information of the radio broadcasting received in the radio reception tuner 21 is certainly outputted through the embedded speaker, earphones, or the like of the portable phone is explained in the above-mentioned third embodiment, the sound information of radio broadcasting may be modulated to be transmitted to the outside.

In the above-mentioned third embodiment, a single A/D converter 33 and a single D/A converter 14 are provided. The A/D converter 33 is shared by the process when the intermediate frequency signal is digitalized and the process when the analog sound signal is digitalized and the D/A converter 14 is shared by the process when the signal is outputted in a analog form to the earphone terminal 54 and the process when the signal is outputted in an analog form to the transmission part 15. However, the present invention is not limited to this example wherein both of the A/D converter 33 and D/A converter 14 are shared.

Although the processing of the reception of radio broadcasting and the input of the analog sound signal are selectively performed in the above-mentioned third embodiment, this example is not construed as limiting the present invention. For example, after digitalizing the intermediate frequency signal generated in the radio reception tuner 21 and the analog sound signal inputted by the analog I/F part 31, both digitalized data may be subjected to parallel processing under a timesharing system in the DSP 34. Then, after converting both processed data into an analog form, one analog data may be outputted through the earphone terminal 54 while allowing the other data to be transmitted through the transmission part 15 to the outside. In this instance, two A/D converters and two D/A converters are required in order to parallelly process two types of data trough A/D conversion and D/A conversion. Regarding the process other than A/D conversion and D/A conversion, at least one DSP 34 is used for parallel processing and circuits each different in processing system are not required.

Although the examples wherein MP3 music data is modulated to be outputted are explained in the above-mentioned first to third embodiments, these are not limiting a form of music data. For example, music data in other form such as Advanced Audio Coding (AAC), Dolby Digital (AC-3), Adaptive Transform Acoustic Coding (ATRAC3), TwinVQ, or Windows Media Audio (WMA: Windows is a registered trademark) may be modulated to be outputted.

Although the examples wherein the MP3 music data stored in the external memory 51 is inputted by the digital I/F 11 are explained in the above-mentioned first to third embodiments, these are not limiting the present invention. For example, the digital data to be inputted may be sound data other than music data. Also, the music data and sound data may be downloaded via the internet by a communication part (not shown, generally embedded on portable phones) different from the digital I/F 11, subjecting to the processing in the DSP 12, 23, and 34.

Although the examples wherein the modulation output devices 10, 20, and 30 are embedded on the portable phone are explained in the above-mentioned first to third embodiments, these are not limiting the device whereon the modulation output devices are embedded. For example, Personal Digital Assistants (PDA), IC recorder, portable phone-type MP3 player, or the like is used as a device whereon the modulation output device 10, 20, or 30 is embedded.

Although the examples wherein the ROM 13 is used as a record medium for storing the controlling programs of the DSP 12, 23, and 34 are explained, these are not limiting the record medium only to the ROM. For example, EEPROM or other semiconductor memory may be use as the record medium.

Besides, the above-described first to third embodiments are not more than specific examples in implementing the present invention and these should not be interpreted as restricting the technological scope of the present invention. That is, the invention may be embodied in other specific forms without departing from the spirit or essential characteristic thereof.

INDUSTRIAL APPLICABILITY

The present invention is useful for portable phones and other electronic devices which allow MP3 digital music information and the like reproduced from an external memory and the like and analog sound information reproduced by an external device to be modulated and then transmitted to the outside.

What is claimed is:

1. A modulation output device, comprising:
   a tuner for receiving an electronic wave of broadcasting to produce an intermediate frequency signal;
   an analog interface part for inputting an analog sound signal;
   a modulation part for converting at least one frequency of said intermediate frequency signal and said analog sound signal in order to adjust the frequency of said intermediate frequency signal and the frequency of said analog sound signal to be equal;
   a digital interface part for inputting first digital sound data;
   a processor for modulating said first digital sound data inputted by said digital interface part to generate first digital modulated data, when necessary, and outputting either said first digital sound data or said first digital modulated data;
   A/D converter for performing analog-to-digital conversion to the intermediate frequency signal and analog sound signal which frequencies are adjusted by said modulation part to convert said intermediate frequency signal to digital broadcasting data and to convert said analog sound signal to second digital sound data;
   D/A converter for converting said first digital sound data and said first digital modulated data outputted from said processor to analog signals and outputting the first analog sound signal converted from said first digital sound data to a speaker embedded in a device or earphone terminal and outputting the first analog modulated signal converted from said first digital modulated data to a transmission part; and
   said transmission part for transmitting the first analog modulated signal outputted from said D/A converter to the outside through a transmission antenna;
   wherein said tuner, said analog interface, said modulation part, said A/D converter, said digital interface part, said processor, said D/A converter, and said transmission part are integrated into one chip.

2. The modulation output device according to claim 1, wherein said one chip is produced by CMOS processing.

3. The modulation output device according to claim 1, wherein the modulation performed by said processor is a quadrature modulation processing.

4. A modulation output device, comprising:
   a tuner for receiving an electronic wave of broadcasting to produce an intermediate frequency signal;
   an analog interface part for inputting an analog sound signal;
   a modulation part for converting at least one frequency of said intermediate frequency signal and said analog sound signal in order to adjust the frequency of said intermediate frequency signal and the frequency of said analog sound signal to be equal;
   a digital interface part for inputting digital sound data;
   a processor for decoding the sound data inputted by said digital interface part to produce first digital sound data and modulating the first digital sound data produced by said decoding, when necessary, to produce first digital modulated data;
   A/D converter for performing analog-to-digital conversion to the intermediate frequency signal and analog sound signal which frequencies are adjusted by said modulation part to convert said intermediate frequency signal to digital broadcasting data and to convert said analog sound signal to second digital sound data;
   a D/A converter for converting said first digital sound data and said first digital modulated data outputted from said processor to analog signals and outputting the first analog sound signal converted from said first digital sound data to a speaker embedded in a device or earphone terminal and outputting the first analog modulated signal converted from said first digital modulated data to a transmission part; and wherein said transmission part is configured for transmitting said first analog modulated signal outputted from said D/A converter to the outside through said transmission part;

wherein said tuner, said analog interface, said modulation part, said A/D converter, said digital interface part, said processor, said D/A converter, and said transmission part are integrated into one chip.

5. The modulation output device according to claim 4, wherein said one chip is produced by CMOS processing.

6. A modulation output device, comprising:

a tuner for receiving an electronic wave of broadcasting to produce an intermediate frequency signal;

analog interface part for inputting an analog sound signal;

modulation part for converting at least one frequency of said intermediate frequency signal and said analog sound signal in order to adjust the frequency of said intermediate frequency signal and the frequency of said analog sound signal to be equal;

A/D converter for converting the intermediate frequency signal outputted from said tuner to digital broadcasting data;

interface part for inputting digital sound data;

processor for selectively performing processing for demodulating digital broadcasting data outputted from said A/D converter to produce digital demodulated data, processing for decoding the sound data inputted by said digital interface part to produce first digital sound data, and processing for modulating the first digital sound data produced by said decoding to produce first digital modulated data;

D/A converter for converting said digital demodulated data, said first digital sound data, and said first digital modulated data outputted from said processor to analog signals and outputting the analog demodulated signal converted from said digital demodulated data and the first analog sound signal converted from said first digital sound data to a speaker embedded in a device or earphone terminal and outputting the first analog modulated signal converted from said first digital modulated data to a transmission part; and said transmission part for transmitting the first analog modulated signal outputted from said D/A converter to the outside through a transmission antenna;

wherein said tuner, said analog interface, said modulation part, said A/D converter, said digital interface part, said processor, said D/A converter, and said transmission part are integrated into one chip.

7. The modulation output device according to claim 6, wherein said one chip is produced by CMOS processing.

8. A modulation output device, comprising:

a tuner for receiving an electronic wave of broadcasting to produce an intermediate frequency signal;

analog interface part for inputting an analog sound signal;

modulation part for converting at least one frequency of said intermediate frequency signal and said analog sound signal in order to adjust the frequency of said intermediate frequency signal and the frequency of said analog sound signal to be equal; and A/D converter for performing analog-to-digital conversion to the intermediate frequency signal and analog sound signal which frequencies are adjusted by said modulation part to convert said intermediate frequency signal to digital broadcasting data and to convert said analog sound signal to second digital sound data;

wherein said tuner, said analog interface part, said modulation part, and said A/D converter are integrated into one chip.

9. The modulation output device according to claim 8, wherein said one chip is produced by CMOS processing.

10. The modulation output device according to claim 8, further comprising:

a processor for selectively performing processing for demodulating said digital broadcasting data outputted from said A/D converter to produce digital demodulated data and processing for modulating said second digital sound data outputted from said A/D converter to produce second digital modulated data;

D/A converter for converting said digital demodulated data and said second digital modulated data outputted from said processor to analog signals and outputting the analog demodulated signal converted from said digital demodulated data to a speaker embedded in a device or earphone terminal and outputting the second analog modulated signal converted from said second digital modulated data to a transmission part; and said transmission part for transmitting said second analog modulated signal outputted from said D/A converter to the outside through a transmission antenna;

wherein said tuner, said analog interface part, said modulation part, said A/D converter, said processor, said D/A converter, and said transmission part are integrated into one chip.

11. The modulation output device according to claim 10, wherein said one chip is produced by CMOS processing.

12. A modulation output device, comprising:

a tuner for receiving an electronic wave of broadcasting to produce an intermediate frequency signal;

a digital interface part for inputting digital sound data;

analog interface part for inputting an analog sound signal;

a modulation part for converting at least one frequency of said intermediate frequency signal and said analog sound signal in order to adjust the frequency of said intermediate frequency signal and the frequency of said analog sound signal to be equal;

A/D converter for converting the analog sound signal inputted by said analog interface part to second digital sound data;

processor for selectively performing processing for decoding the sound data inputted by said digital interface part to produce first digital sound data, processing for modulating said first digital sound data produced by said decoding to produce first digital modulated data, processing for modulating the second digital sound data outputted from said A/D converter to produce second digital modulated data;

D/A converter for converting said first digital sound data, said second digital sound data, said first digital modulated data, and said second digital modulated data outputted from said processor to analog signals and outputting the first and second analog sound signals converted from said first and second digital sound data to a speaker embedded in a device or earphone terminal and outputting the first and second analog modulated signals converted from said first and second digital modulated data to a transmission part; and said transmission part for transmitting said first and second analog modulated signals outputted from said D/A converter to the outside through a transmission antenna;

wherein said tuner, said digital inter face part, said analog interface part, said modulation part, said A/D converter, said processor, said D/A converter, and said transmission part are integrated into one chip.

13. The modulation output device according to claim 12, wherein said one chip is produced by CMOS processing.

14. A modulation output device, comprising:

a tuner for receiving an electronic wave of broadcasting to produce an intermediate frequency signal;

digital interface part for inputting digital sound data;

analog interface part for inputting an analog sound signal;

modulation part for converting at least one frequency of said intermediate frequency signal and said analog sound signal in order to adjust the frequency of said intermediate frequency signal and the frequency of said analog sound signal to be equal;

A/D converter for performing analog-to-digital conversion to the intermediate frequency signal and analog sound signal which frequencies are adjusted by said modulation part to convert said intermediate frequency signal to digital broadcasting data and to convert said analog sound signal to second digital sound data;

processor for selectively performing processing for demodulating said digital broadcasting data outputted from said A/D converter to produce digital demodulated data, processing for decoding the sound data inputted by said digital interface part to produce first digital sound data, processing for modulating said first digital sound data produced by said decoding to produce first digital modulated data, and processing for modulating said second digital sound data outputted from said A/D converter to produce second digital modulated data;

D/A converter for converting said digital demodulated data, said first digital sound data, said second digital sound data, said first digital modulated data, and said second digital modulated data outputted from said processor to analog signals and outputting the analog demodulated signal converted from said digital demodulated data and the first and second analog sound signals converted from said first and second digital sound data to a speaker embedded in a device or earphone terminal and outputting the first and second analog modulated signals converted from said first and second digital modulated data to a transmission part; and said transmission part for transmitting said first and second analog modulated signals outputted from said D/A converter to the outside through a transmission antenna;

wherein said tuner, said digital interface part, said analog interface part, said modulation part, said A/D converter, said processor, said D/A converter, and said transmission part are integrated into one chip.

15. The modulation output device according to claim 14, wherein said one chip is produced by CMOS processing.

* * * * *

UNITED STATES PATENT AND TRADEMARK OFFICE
CERTIFICATE OF CORRECTION

| | | |
|---|---|---|
| PATENT NO. | : 7,496,419 B2 | Page 1 of 1 |
| APPLICATION NO. | : 11/611026 | |
| DATED | : February 24, 2009 | |
| INVENTOR(S) | : Takeshi Ikeda et al. | |

It is certified that error appears in the above-identified patent and that said Letters Patent is hereby corrected as shown below:

Title page item (73) Assignee should read as follows:

Niigata Seimitsu Co., Ltd., Jyoetsu-shi (JP); and Ricoh Co. Ltd., Tokyo (JP)

Signed and Sealed this

Thirteenth Day of April, 2010

David J. Kappos
*Director of the United States Patent and Trademark Office*